United States Patent [19]
Chambers et al.

[11] Patent Number: 5,825,834
[45] Date of Patent: Oct. 20, 1998

[54] FAST RESPONSE SYSTEM IMPLEMENTING A SAMPLING CLOCK FOR EXTRACTING STABLE CLOCK INFORMATION FROM A SERIAL DATA STREAM WITH DEFINED JITTER CHARACERISTICS AND METHOD THEREFOR

[75] Inventors: Peter Chambers, Scottsdale; David Ross Evoy, Tempe, both of Ariz.

[73] Assignee: VLSI Technlogy, Inc., San Jose, Calif.

[21] Appl. No.: 542,856

[22] Filed: Oct. 13, 1995

[51] Int. Cl.$^6$ ................................... H04L 7/033
[52] U.S. Cl. ................ 375/360; 375/371; 327/161
[58] Field of Search ................ 375/354, 363, 375/362, 371, 359, 360, 373, 375, 376, 372; 327/141, 144, 145, 146, 147, 150, 156, 158, 159, 161

[56] References Cited

U.S. PATENT DOCUMENTS 4,885,758  12/1989  Speckenbach ................ 375/371
5,313,501   5/1994  Thacker ........................ 375/369

*Primary Examiner*—Chi H. Pham
*Assistant Examiner*—William Luther
*Attorney, Agent, or Firm*—Harry M. Weiss; Jeffrey D. Moy; Harry M. Weiss & Associates, P.C.

[57] ABSTRACT

The present invention relates to a clock recovery system which allows for stable clock information to be extracted from a serial data stream with defined jitter characteristics. The clock recover circuit is comprised of a flip flop which is used for receiving the serial data stream and for outputting stable clock information. A sampling clock circuit is coupled to the flip flop for sending a signal which reflects a center area of each bit period in the serial data stream when a transition occurs in the serial data stream.

16 Claims, 2 Drawing Sheets

THE 0 OR 1 WITHIN EACH STATE INDICATES THE VALUE OF THE SAMPLING CLOCK OUTPUT OF THE CLOCK RECOVERY CIRCUIT, THE INCOMING USB DATA IS SAMPLED WHEN THE SAMPLING CLOCK OUTPUT TRANSITIONS FROM A ZERO TO A ONE (A RISING EDGE)

FAST RESPONSE SYSTEM IMPLEMENTING A SAMPLING CLOCK FOR EXTRACTING STABLE CLOCK INFORMATION FROM A SERIAL DATA STREAM WITH DEFINED JITTER CHARACERISTICS AND METHOD THEREFOR

BACKGROUND OF THE INVENTION

1. Field of the Invention

This invention relates to a circuit for extracting information from a serial data stream and, more specifically, to a fast response system that is capable of extracting stable clocks information from a serial data stream with defined jitter characteristics within one bit time.

2. Description of the Prior Art

An asynchronous serial data stream (i.e., a signal that is comprised of a mixture of data and clock information) is often sent to a device from which a stable clock signal must be extracted. The serial data stream generally consists of consecutive bit frames, each bit frame having a nominal bit width. The nominal width of the bit frame has a variance which is defined as jitter characteristics. Currently, there are no systems which are capable of extracting a stable clock signal when a serial data stream with defined jitter characteristics is inputted.

Therefore, a need existed to provide a system that is capable of receiving a serial data stream with defined jitter characteristics from which a stable clock signal can be extracted. The system will produce a clock signal which is aligned appropriately with the serial data stream for at least six consecutive bit periods and is capable of responding within one bit time to any change in the behavior of the incoming serial data stream. The system must consume very little power and be deterministic in its behavior. That is, the system must never miss any bit frames in the incoming serial data stream so long as the serial data stream adheres to its defined jitter characteristics.

SUMMARY OF THE INVENTION

In accordance with one embodiment of the present invention, it is an object of the present invention to provide a system that is capable of receiving a data stream with defined jitter characteristics from which a stable clock signal can be extracted.

It is another object of the present invention to provide a system that will produce a clock signal which is aligned appropriately with the serial data stream and is capable of responding within one bit time to any change in the behavior of the incoming serial data stream.

It is still another object of the present invention to provide a system that will produce a clock signal which is aligned appropriately with the serial data stream that will remain accurately synchronized with the serial data stream for at least six consecutive bit periods.

BRIEF DESCRIPTION OF THE PREFERRED EMBODIMENT

In accordance with one embodiment of the present invention, a fast response system for extracting stable clock information from a serial data stream with defined jitter characteristics within one bit time is disclosed. The system is comprised of flip flop means for receiving the serial data stream and for outputting the stable clock information. Sampling clock means are coupled to the flip flop means for sending a signal which reflects a center area of each bit period in the serial data stream when a transition occurs in the serial data stream. The sampling clock means is comprised of state machine means which are coupled to the flip flop means for sending a signal which reflects the center area of each of the bit periods in the serial data stream when a transition occurs in the serial data stream. Sampling circuit means are coupled to the state machine means for producing a pulse signal which is sent to the state machine means to signal the state machine means when a transition occurs in the data stream.

In accordance with another embodiment of the present invention, a method for providing a fast response system for extracting stable clock information from a serial data stream with defined jitter characteristics is disclosed. The method comprises the steps of: providing flip flop means for receiving the serial data stream and for outputting the stable clock information; and sending a sampling clock signal which reflects a center area of each bit period in the serial data stream when a transition occurs in the serial data stream. The step of sending a sampling clock signal further comprises the steps of: providing state machine means coupled to the flip flop means for sending a signal which reflects the center area of each of the bit periods in the serial data stream when a transition occurs in the serial data stream; and providing sampling circuit means coupled to the state machine means for producing a pulse signal which is sent to the state machine means to signal the state machine means when a transition occurs in the data stream.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 4:
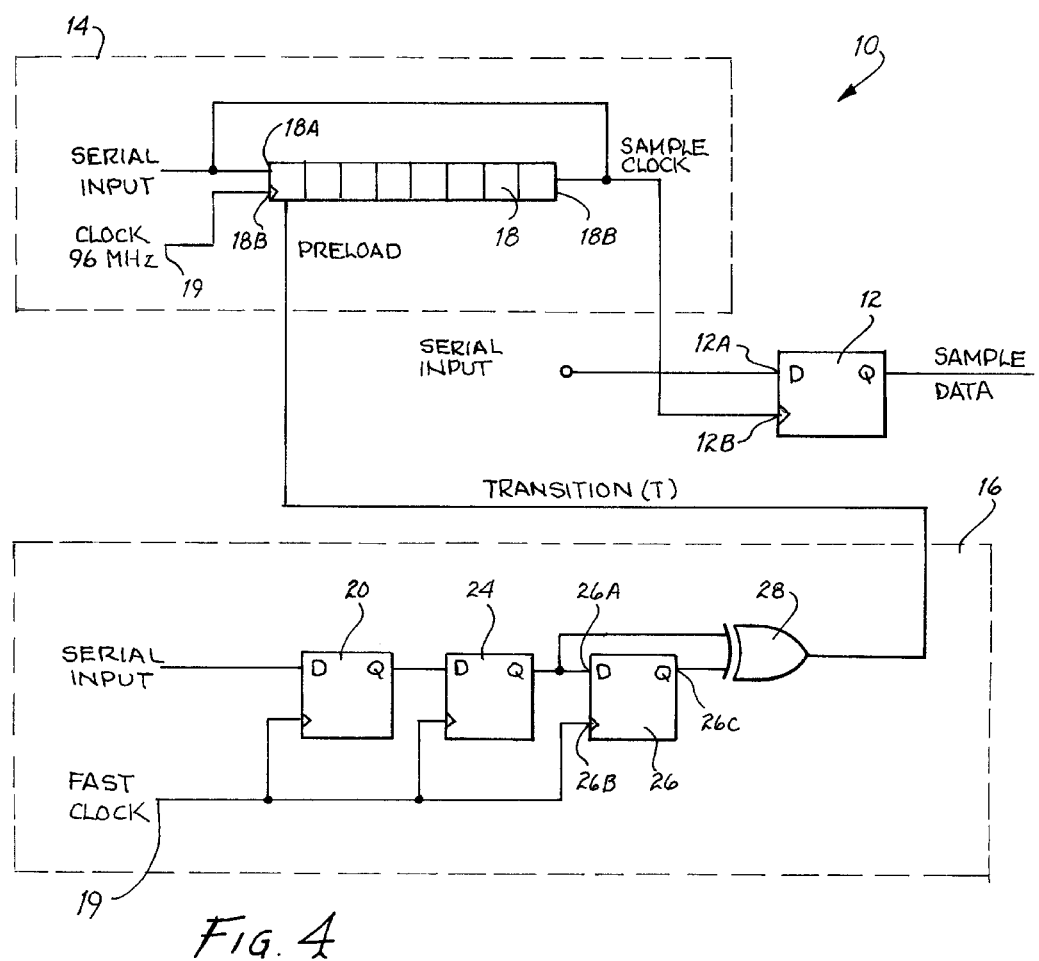
FIG. 4 shows a simplified block diagram of the clock recovery system of the present invention.

Referring to FIG. 4, a clock recovery system (hereinafter system) 10 is shown. The system 10 is capable of extracting stable clock information from a serial data stream with defined jitter characteristics within one bit time. The system 10 is comprised of a flip flop 12. The flip flop 12 receives a serial data stream at an input 12A. The serial data stream is an asynchronous signal and is comprised of data and clock information. The serial data stream generally consists of consecutive bit frames, each bit frame having a nominal bit width. The nominal width of the bit frame has a variance which is defined as jitter characteristics. The flip flop 12 takes the serial data stream and outputs stable clock information.

A state machine 14 is coupled to an input 12B of the flip flop 12. The state machine 14 sends a sampling clock signal to the flip flop 12 when a transition occurs in the serial data stream (i.e., a change in the rising or falling edge of the serial data stream). The sampling clock signal reflects a center area of each of the bit frames in the serial data stream. The sampling clock signal is set at eight times the bit rate of the serial data stream. In the preferred embodiment of the present invention, the sampling clock signal is set at 98 MHz with the serial data stream being sampled on the rising edges of the sampling clock signal. However, a sampling clock signal of 48 MHz could be used wherein the serial data stream is being sampled on the rising and falling edges of the sampling clock signal.

A sampling circuit 16 is coupled to the state machine 14 in order to signal the state machine 14 when a transition has, occurred in the serial data stream. When a transition is detected by the sampling circuit 16, the sampling circuit generates a pulse signal which is sent to the state machine 14 to signal the state machine 14 that a transition has occurred.

Figure 1:
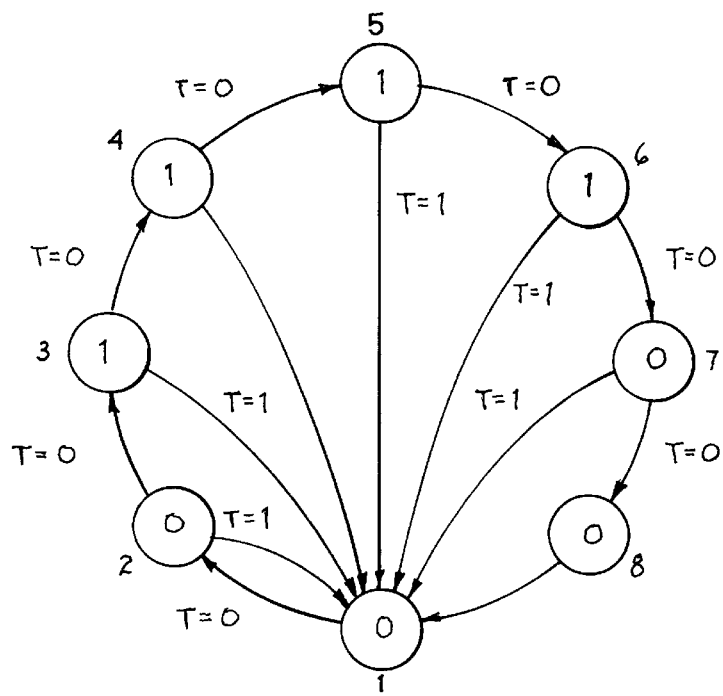
FIG. 1 shows a state diagram of a clock recovery system of the present invention which is capable of extracting stable clock information from a serial data stream with defined jitter characteristics.
Figure 2:
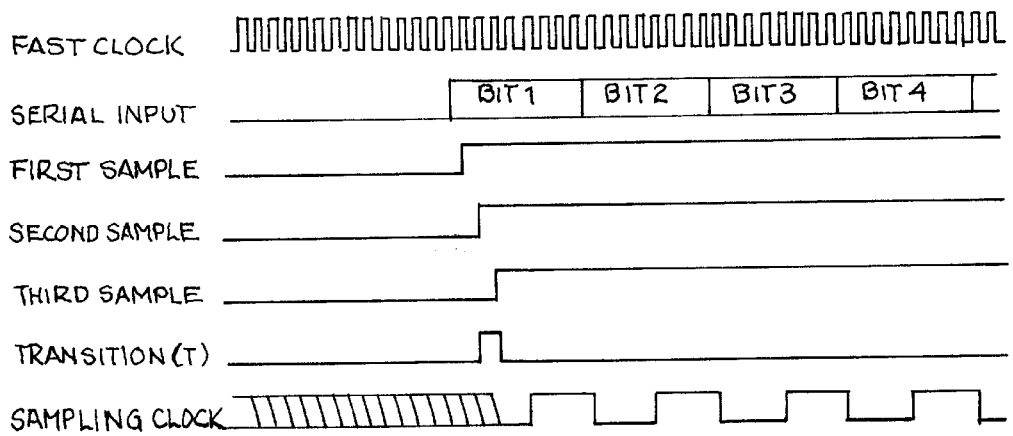
FIG. 2 shows a timing diagram for the clock recovery system of the present invention.
Figure 3:
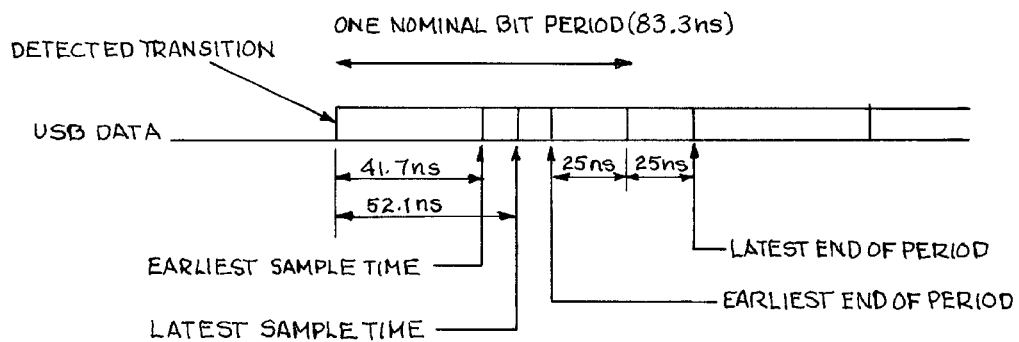
FIG. 3 shows the timing analysis for the clock recovery system of the present invention.

Referring now to FIG. 3, in the preferred embodiment of the present invention, the serial data stream has a nominal bit rate of 12 Mbits/second and a maximum jitter characteristic of 25 ns. Under this embodiment, the nominal bit period of each bit frame of the serial data stream is 83.3 ns. With a jitter of 25 ns, the bit period can be as short as 58.3 ns, or as long as 108.3 ns. Thus, under the present embodiment, the state machine 14 must send a sampling clock signal to the flip flop 12 no later than 52.1 ns and no earlier than 41.7 ns to sample the serial data stream accurately.

Referring back to FIG. 4, in the preferred embodiment of the present invention, if the nominal bit rate of the serial data stream is 12 Mbits/second, the state machine may be comprised of an eight bit shift register 18. The eight bit shift register 18 has an input 18A which is coupled to the serial data stream and an input 18B coupled to a fast clock 19. The fast clock 19 is set at a frequency that is eight times the bit rate of the serial data stream. In the preferred embodiment of the present invention, the fast clock 19 is set at 98 MHz. An output 18B of the eight bit shift register 18 is coupled to the flip flop 12 and is also fed back to the input 18A of the eight bit shift register 18. The eight bit shift register 18 is parallel loaded with a pattern of 0 0 1 1 1 1 0 0 when the system 10 is reset and when a transition in the serial data stream is detected.

In the preferred embodiment of the present invention, the sampling circuit 16 is comprised of a first flip flop 20. The first flip flop 20 is coupled to the serial data stream and to a fast clock 19. The fast clock 19, is set at eight times the frequency of the incoming serial data stream, or in the preferred embodiment of the present invention, 98 MHz. The first flip flop 20 is used for synchronizing the serial data stream to the fast clock 22. A second flip flop 24 is coupled to an output of the first flip flop 20 and to the fast clock 22. The second flip flop 24 is used for providing redundancy in synchronizing the serial data stream to the fast clock and to avoid metastable conditions. A third flip flop 26 has an input 26A coupled to an output of the second flip flop 24, an input 26B coupled to the fast clock 22 and an output 26C coupled to an exclusive OR (XOR) gate 28. The third flip flop 26 is used for generating a transition pulse (T). The transition pulse, which is one fast clock period in width, is generated when a transition is detected in the serial data stream. The XOR gate 26 is coupled to an output of the second flip flop 24 and to the output 26C of the third flip flop 26. The XOR gate 28 ensures that the transition pulse occurs on the rising and falling edges of the serial data stream.

OPERATION

With reference to FIGS. 1–4, the following is a brief discussion of the operation of the system 10. As can be seen from the state diagram, FIG. 1, if there are no transitions in the serial data stream, T=0, the state machine 14 will generate at sampling clock signal which is a square wave (i.e., the output of the state machine is 0 0 1 1 1 1 0 0). When a transition in the serial data stream is detected, T=1, the state machine is resynchronized and the sampling clock signal returns to position 1 (i.e. the eight bit shift register (FIG. 4) is reloaded with the pattern 0 0 1 1 1 1 0 0). For example, if a transition occurs between state 3 and state 4, the state machine will first output a 1 (state 4) and then be reset to state 1.

The state machine will not be reset until the sampling circuit 16 signals the state machine 14 that a transition has been detected. When the sampling circuit 16 detects a transition in the serial data stream, a pulse is generated which is one fast clock period in width. The pulse is sent to the state machine, which allows the sampling clock signal to sample the serial data stream near the middle of each bit frame.

The system 10 will remain accurately synchronized with the serial data stream for at least six consecutive bit periods. A transition is certain to occur after six periods since a transmitter (not shown) will insert a transition even if the serial data stream does not require one. This is known as "bit stuffing" since bits are transmitted in the serial data stream. Bit stuffing is commonly known to those skilled in the art and will not be further described.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A fast response system for extracting stable clock information from a serial data stream with defined jitter characteristics within one bit time comprising, in combination:

flip flop means for receiving said serial data stream and for outputting said stable clock information; and sampling clock means coupled to said flip flop means for sending a signal which reflects a center area of each bit period in said serial data stream;

wherein said sampling clock means sends said signal which reflects said center area of each of said bit periods of said serial data stream when a transition occurs in said serial data stream;

said sampling clock means comprising:

state machine means coupled to said flip flop means for sending said signal which reflects said center area of each of said bit periods in said serial data stream when said transition occurs in said serial data stream; and sampling circuit means coupled to said state machine means for producing a pulse signal which is sent to said state machine means to signal said state machine means when said transition occurs in said serial data stream;

wherein said serial data stream has a nominal bit rate of 12 Mbits/second; and wherein said state machine means comprises an eight bit shift register having an output coupled to said flip flop means and to an input of said eight bit shift register, said eight bit shift register further being coupled to a fast clock that is set at eight times a bit rate of said serial data stream, said eight bit data shift register being parallel loaded with a pattern of 0 0 1 1 1 1 0 0 to produce a square wave sampling clock.

2. A fast response system for extracting stable clock information from a serial data stream with defined jitter characteristics in accordance with claim 1 wherein said eight bit shift register is reset with said pattern of 0 0 1 1 1 1 0 0 when said transition in said serial data stream is detected.

3. A fast response system for extracting stable clock information from a serial data stream with defined jitter characteristics in accordance with claim 1 wherein said fast clock is set at 96 MHz.

4. A fast response system for extracting stable clock information from a serial data stream with defined jitter characteristics in accordance with claim 1 wherein said sampling circuit means comprises:

first flip flop means coupled to said serial data stream and to a fast clock for synchronizing said serial data stream to said fast clock;

second flip flop means coupled to an output of said first flip flop means and to said fast clock for providing redundancy in synchronizing said serial data stream to said fast clock; and means for generating a pulse during a rising edge and falling edge of said serial input, said pulse being one fast clock period in width.

5. A fast response system for extracting stable clock information from a serial data stream with defined jitter characteristics in accordance with claim 4 wherein said means for generating a pulse comprises:

exclusive OR (XOR) gating means coupled to an output of said second flip flop means for ensuring that said pulse occurs on said rising and said falling edges of said serial data stream; and third flip flop means having an input coupled to an output of said second flip flop means and an output coupled to said XOR gating means for generating said pulse being one fast clock period in width.

6. A fast response system for extracting stable clock information from a serial data stream with defined jitter characteristics in accordance with claim 4 wherein said fast clock operates at 96 MHz.

7. A fast response system for extracting stable clock information from a serial data stream having a nominal bit rate of 12 Mbits/second with defined jitter characteristics within one bit time comprising, in combination:

flip flop means for receiving said serial data stream and for outputting said stable clock information;

state machine means coupled to said flip flop means for sending a signal which reflects a center area of each bit period in said serial data stream when a transition occurs in said serial data stream, said state machine comprises an eight bit shift register having an output coupled to said flip flop means and to an input of said eight bit shift register, said eight bit shift register further being coupled to a fast clock that is set at eight times a bit rate of said serial data stream, said eight bit data shift register being parallel loaded with a pattern of 0 0 1 1 1 1 0 0 to produce a square wave sampling clock, said eight bit shift register being reset with said pattern of 0 0 1 1 1 1 0 0 when said transition in said serial data stream is detected; and sampling circuit means coupled to said state machine means for producing a pulse signal which is sent to said state machine means to signal said state machine means when said transition occurs in said data stream, said sampling circuit means comprising:

first flip flop means coupled to said serial data stream and to said fast clock for synchronizing said serial data stream to said fast clock;

second flip flop means coupled to an output of said first flip flop means and to said fast clock for providing redundancy in synchronizing said serial data stream to said fast clock;

exclusive OR (XOR) gating means coupled to an output of said second flip flop means for ensuring that said pulse occurs on rising and falling edges of said serial data stream; and third flip flop means having an input coupled to an output of said second flip flop means and an output coupled to said XOR gating means for generating said pulse being one fast clock period in width.

8. A fast response system for extracting stable clock information from a serial data stream with defined jitter characteristics in accordance with claim 7 wherein said fast clock is set at 96 MHz.

9. A fast response system for extracting stable clock information from a serial data stream with defined jitter characteristics within one bit time comprising, in combination:

flip flop means for receiving said serial data stream and for outputting said stable clock information;

state machine means coupled to said flip flop means for sending a signal which reflects said center area of each of said bit periods in said serial data stream when said transition occurs in said serial data stream, said state machine comprises a shift register having an output coupled to said flip flop means and to an input of said shift register and an input coupled to a fast clock, said shift register being parallel loaded with a pattern to produce a square wave sampling clock, said shift register being reset with said pattern when said transition in said serial data stream is detected; and sampling circuit means coupled to said state machine means for producing a pulse signal which is sent to said state machine means to signal said state machine means when said transition occurs in said data stream, said sampling circuit means comprising:

first flip flop means coupled to said serial data stream and to said fast clock for synchronizing said serial data stream to said fast clock;

second flip flop means coupled to an output of said first flip flop means and to said fast clock for providing redundancy in synchronizing said serial data stream to said fast clock;

exclusive OR (XOR) gating means coupled to an output of said second flip flop means for ensuring that said pulse occurs on rising and falling edges of said serial data stream; and third flip flop means having an input coupled to an output of said second flip flop means and an output coupled to said XOR gating means for generating said pulse being one fast clock period in width.

10. A fast response system for extracting stable clock information from a serial data stream with defined jitter characteristics in accordance with claim 9 wherein said serial data stream has a nominal bit rate of 12 Mbits/second.

11. A fast response system for extracting stable clock information from a serial data stream with defined jitter characteristics in accordance with claim 9 wherein said fast clock is set at 96 MHz.

12. A method for providing a fast response system for extracting stable clock information from a serial data stream with defined jitter characteristics comprising the steps of:

providing flip flop means for receiving said serial data stream and for outputting said stable clock information; and sending a sampling clock signal which reflects a center area of each bit period in said serial data stream when a transition occurs in said serial data stream;

said step of sending said sampling clock signal further comprising the steps of:

providing state machine means coupled to said flip flop means for sending said signal which reflects said center area of each of said bit periods in said serial data stream when said transition occurs in said serial data stream; and providing sampling circuit means coupled to said state machine means for producing a pulse signal which is sent to said state machine means to signal said state machine means when said transition occurs in said serial data stream;

wherein said serial data stream has a nominal bit rate of 12 Mbits/second; and wherein said step of providing said state machine means further comprises the step of providing an eight bit shift register having an output coupled to said flip flop means and to an input of said eight bit shift register, said eight bit shift register further being coupled to a fast clock that is set at eight times said bit rate of said serial data stream, said eight bit data shift register being parallel loaded with a pattern of 0 0 1 1 1 1 0 0 to produce a square wave sampling clock, said eight bit shift register being reset with said pattern of 0 0 1 1 1 1 0 0 when said transition in said serial data stream is detected.

13. The method of claim 12 wherein said fast clock is set at 96 MHz.

14. The method of claim 12 wherein said step of providing sampling circuit means further comprises the steps of:

providing first flip flop means coupled to said serial data stream and to a fast clock for synchronizing said serial data stream to said fast clock;

providing second flip flop means coupled to an output of said first flip flop means and to said fast clock for providing redundancy in synchronizing said serial data stream to said fast clock; and providing means for generating a pulse during a rising edge and a falling edge of said serial data stream, said pulse being one fast clock period in width.

15. The method of claim 14 wherein said step of providing means for generating a pulse further comprises the steps of:

providing exclusive OR (XOR) gating means coupled to an output of said second flip flop means for ensuring that said pulse occurs on said rising and said falling edges of said serial data stream; and providing third flip flop means having an input coupled to an output of said second flip flop means and an output coupled to said XOR gating means for generating said pulse being one fast clock period in width.

16. The method of claim 14 wherein said fast clock operates at 96 MHz.

\* \* \* \* \*